No. 897,368. PATENTED SEPT. 1, 1908.
H. K. HOLSMAN.
AUTOMOBILE.
APPLICATION FILED JUNE 12, 1907.
2 SHEETS—SHEET 2.
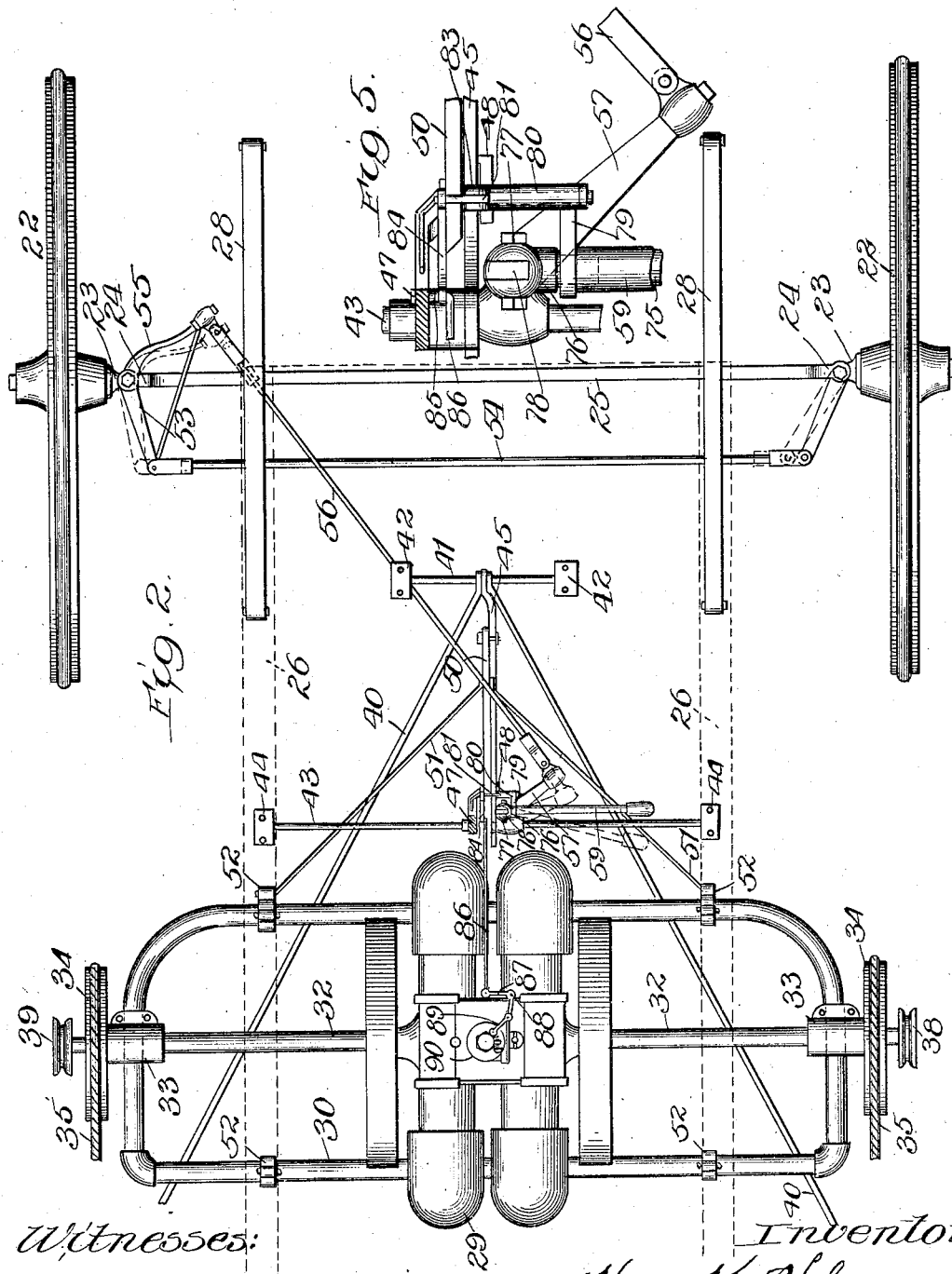

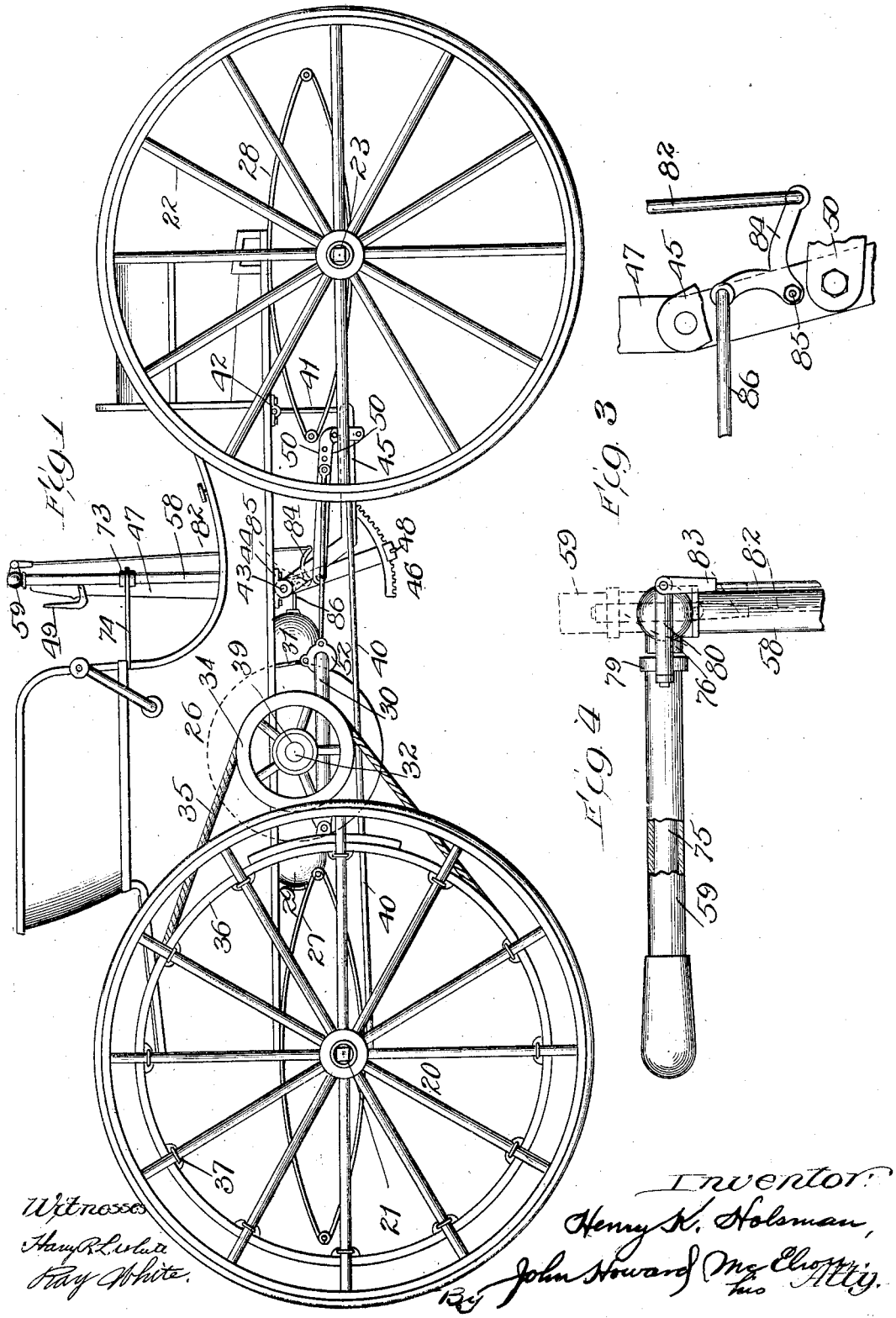

UNITED STATES PATENT OFFICE.

HENRY K. HOLSMAN, OF CHICAGO, ILLINOIS.

AUTOMOBILE.

No. 897,368.  Specification of Letters Patent.  Patented Sept. 1, 1908.

Original application filed February 8, 1907, Serial No. 356,393. Divided and this application filed June 12, 1907. Serial No. 378,502.

*To all whom it may concern:*

Be it known that I, HENRY K. HOLSMAN, a citizen of the United States, and resident of Chicago, in the county of Cook and State of Illinois, have invented certain new and useful Improvements in Automobiles, of which the following is a full, clear, and exact specification.

My present application, which is a division of my original application No. 356,393, filed February 8, 1907, is concerned with a novel steering handle combined with the engine throttling mechanism so that a single element may be used both to steer and to control the speed of the vehicle.

It is further concerned with a steering handle so combined with the throttling mechanism that as the handle is moved into position so that the driver can readily leave the car, the throttling mechanism is automatically moved to position to cut off the fuel supply and thus stop the engine.

To illustrate my invention, I have annexed hereto two sheets of drawings, in which the same reference characters are used to designate identical parts in all the figures, of which,—

Figure 1 is a side elevation of an automobile containing my invention; Fig. 2 is a plan view of the forward portion of the running gears thereof, with the engine in place; Fig. 3 (Sheet 1) is an enlarged detail of part of the mechanism shown in Fig. 1, with a portion of the connecting link broken away to show the bell crank behind it; Fig. 4 is a detail showing, in front elevation, the connections between the handle and the steering post proper; and Fig. 5 (Sheet 2) is an enlarged top plan view of a portion of the mechanism shown in Fig. 2.

While it will be understood that my improvements might be applied to different types of automobiles, I have illustrated them as applied to an automobile of the type shown in my Patent No. 697,720, dated April 15, 1902, and in my companion application No. 352,848, filed January 18, 1907. In this type of automobiles, the traction wheels 20 are mounted on the rear axle bar 21, and the steering wheels 22 are mounted on the axles 23, which are pivoted in yokes 24 secured on the front axle bar 25. The bed or body 26 of the vehicle is secured at its rear end to springs 27 secured on the rear axle 21, and at its forward end upon springs 28 secured on the front axle bar 25. I have illustrated the machine as being driven from the engine 29, which is carried by a swinging frame 30, which is pivoted by links 31 to side bars on the bed 26, all as is fully disclosed in the companion application No. 352,848, before referred to. The engine shaft 32 is journaled in bearings 33 carried by the frame 30, and has secured just outside of the bearings, driving pulley-wheels 34, around which pass driving cables 35, which also pass around the driving rim 36 secured to rotate with the traction wheels in any convenient manner, as, for instance, by being secured to the spokes by clips 37. Outside of the pulley wheels 34 and in the plane of the tires 38 of the traction wheels, I secure reversing disks 39, which are adapted to coöperate with the tires and drive the machine backward when the engine is swung from the forward driving position shown in Fig. 1 back until the reversing disks 39 engage the tires. Of course, it will be understood that the rearward movement of the engine releases the tension on the cable 35 until it does not transmit the rotation of the driving pulley-wheel 34 to the rim 36. The rear axle 21 has secured thereto diagonal distance rods 40, which extend to and are secured at the lower end of a V-shaped link 41, the upper ends of which are journaled in bearings 42 secured to the bottom of the bed.

A rock shaft or rod 43 is mounted or secured in bearings 44 carried by the sides of the bed, so that it is capable of springing slightly at the center, and a connecting bar 45 is mounted at its upper end centrally of said rock shaft or rod 43, and has its forward and lower end secured on the link 41 between the ends of the distance rods 40. The connecting bar 45 has secured thereon, or preferably formed integral therewith, a segmental ratchet bar 46 and an operating lever 47, which is secured upon the part 43 if it be a rock shaft, or journaled thereon if it be a rod, and has associated therewith a locking detent dog 48, which may be of any desired construction, and which coöperates with the teeth of the segment 46, being moved out of engagement therewith by the operation of the handle 49. Any desired connections may be employed between the detent 48 and the handle 49, one specific form being shown in my aforesaid companion application No.

352,848. The lever 47 has pivoted thereto a link bar 50, which has a loop at its forward and lower end which slides on the horizontal portion of the connecting bar 45, and this link bar 50, in turn, has pivoted thereto link rods 51, which are connected to the forward pair of collars 52 by which the links 31 are connected to the engine frame.

It will be readily apparent from the foregoing description that as the upper end of the operating lever 47 is moved to the rear, or toward the driver, the engine will be shifted so as to tighten the rope 35 and drive the vehicle, and that it can be locked in any position of tension required. As the upper end of the lever is moved in the opposite direction, the engine is moved to the rear, and the tension of the rope 35 slackened to stop the vehicle; and if it is desired to reverse the vehicle, the engine is swung still farther to the rear until the reversing disks 39 engage the tires 38, when the vehicle will be backed slowly. The foregoing part of my invention is fully described and claimed in my aforesaid companion application No. 352,848.

The axles 23 of the steering wheels 22 are provided at the rear thereof with arms 53, which are connected by a link 54, so that when the arm 55 connected to one of the axles is shifted by means of a link 56, which is pivoted at its other end to the lower arm 57 upon the steering post 58, which has a horizontal handle bar 59 at its upper end, both wheels will be turned simultaneously in the same direction.

The steering post 58 is shown as journaled in a bearing 73 supported by brackets 74 extending forward from the seat, and is also journaled at its lower end in a bearing (not shown) in the bottom of the bed 26. The handle 59 consists of a sleeve terminating in the handle portion proper and mounted to slide longitudinally upon, as well as rotate upon, a sleeve or rod 75 which is secured upon the hinge member 76, which has a yoke-shaped end, and is pivoted by means of a pin 77 upon the blade hinge member 78 projecting upward from the top of the post 58. The sleeve 59 constituting the handle has secured at its inner end an arm 79 which terminates in an elongated bearing sleeve 80 for the rod 81 secured to rotate therein, and having a connecting link 82 pivoted at its inner end by a yoke 83, as best shown in Figs. 4 and 5. By this construction, it will be apparent that as the handle 59 is rotated, the link 82 will be raised or lowered without in any way interfering with the general direction of the handle which controls the direction of movement of the vehicle. It will also be noted, from Fig. 4, that when the handle 59 is turned to a vertical position, as is customary to get it out of the way when leaving the vehicle, the link 82 is necessarily thrust downward so as to completely throttle the engine, and thus automatically secure its stopping without any further attention on the part of the operator. This feature is advantageous, as the driver automatically stops the engine as he leaves the vehicle, unless he takes pains not to do so by sliding the handle 59 upward slightly on the rod 75 as he throws it to a vertical position, as he can do, if desired. The link 82 is pivoted at its lower end to the bell crank 84, which is pivoted at 85 upon the lower end of the operating lever 47, so that the connections swing with said lever as the engine is moved in either direction, and this is a novel feature of my invention applicable to structures where the engine is moved in controlling the driving of the vehicle. If the engine were stationary, of course, it will be understood that the bell crank 84 would be located upon some stationary part of the vehicle. As it is, its other end is connected by a rod 86 with a bell crank 87 pivoted at 88 upon the engine and having its other end connected to a link 89 which operates the throttling mechanism 90, whether the same be for steam or gasolene, although it will be apparent that my invention is especially intended for gasolene engines.

While I have shown and described my invention in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In an automobile, the combination with running gears, of a steering wheel having its axle pivoted thereon, a steering arm secured to the axle, a vertical rock shaft, link connections between the rock shaft and the steering arm, a horizontal arm connected to the rock shaft to swing it to steer the vehicle but movable relative thereto, an elongated handle and sleeve journaled on the horizontal arm, engine-throttling mechanism, and connections between the engine-throttling mechanism and the sleeve, whereby the latter may be rotated in one position of the arm and moved longitudinally thereof in another position to control the speed of the vehicle.

2. In an automobile, the combination with running gears, of a steering wheel having its axle pivoted thereon, a steering arm secured to the axle, a vertical rock shaft, link connections between the rock shaft and the steering arm, a horizontal arm pivotally connected to the rock shaft so it can be swung to a vertical position, said arm being used to swing the rock shaft to steer the vehicle, an elongated handle and sleeve journaled on the horizontal arm, engine-throttling mechanism, and connections between the engine-throttling mechanism and the sleeve, whereby the latter may be rotated on the horizontal arm independently thereof in the horizontal position of the arm and moved longitudinally thereof in the vertical position of the arm to control the speed of the vehicle.

3. In an automobile, the combination with running gears, of a traction wheel journaled thereon, a steering wheel axle pivoted on the running gears, a steering wheel, connections between the axle and the steering wheel, a steering member, a handle carried thereby, an engine movable to driving and non-driving position, connections between the engine-shaft and the traction wheel, engine-throttling mechanism, and connections between the handle and the engine-throttling mechanism operative in any position of the engine.

4. In an automobile, the combination with running gears, of a traction wheel journaled thereon, an engine movable to driving and non-driving position, driving connections between the engine and the traction wheel, engine-throttling mechanism upon the engine, an engine-throttling-mechanism-controlling member mounted upon a relatively stationary part of the vehicle, and connections between said engine-throttling mechanism and the controlling-mechanism therefor operative in any position of the engine.

5. In an automobile, the combination with running gears, of a traction wheel journaled thereon, an engine movable to driving and non-driving position, connections between the engine-shaft and the driving wheel, an engine-shifting member, engine-throttling mechanism carried by the engine, an engine-throttling-mechanism-controlling member mounted on a relatively stationary part of the vehicle, and connections between the engine-throttling-mechanism-controlling member and the engine-throttling mechanism, one element thereof being mounted upon the engine-shifting members so as to make the controlling mechanism operative in any position of the engine.

6. In an automobile, the combination with running gears, of a steering wheel having its axle pivoted thereon, engine-throttling mechanism, a steering member, connections from the steering member to the steering-wheel axle, a handle by which the steering member is moved, said handle being movable from its normal position to facilitate egress from the car, and connections between the handle and the engine-throttling mechanism whereby as the handle is moved to position to permit the driver to leave the car, the engine-throttling mechanism is automatically moved to position to stop the engine.

7. In an automobile, the combination with running gears, of a steering wheel having its axle pivoted thereon, engine-throttling mechanism, a steering member, connections from the steering member to the steering-wheel axle, a handle by which the steering member is moved, said handle being movable from its normal position to facilitate egress from the car, and connections between the handle and the engine-throttling mechanism whereby as the handle is moved to position to permit the driver to leave the car, the engine-throttling mechanism is automatically moved to position to stop the engine, said handle, however, being movable to still another abnormal position to prevent the automatic stopping of the engine, if desired.

In witness whereof, I have hereunto set my hand and affixed my seal.

HENRY K. HOLSMAN. [L. S.]

Witnesses:
M. S. REEDER,
JOHN HOWARD MCELROY.